July 23, 1963 R. M. RICHARDSON 3,098,971

REMOTELY ACTUATED RADIO FREQUENCY POWERED DEVICES

Filed Sept. 26, 1961

INVENTOR
ROBERT M. RICHARDSON

BY Scrivener & Parker
ATTORNEYS

United States Patent Office 3,098,971

Patented July 23, 1963

3,098,971

REMOTELY ACTUATED RADIO FREQUENCY POWERED DEVICES

Robert M. Richardson, Sterling, Va.

Filed Sept. 26, 1961, Ser. No. 140,892
2 Claims. (Cl. 325—9)

This invention relates to remotely actuated devices which derive their operating power from transmitted radio frequency energy and, more particularly, to radio receivers and transmitters or transponders operating in this manner.

This invention is particularly well adapted to the remote actuation and powering of hidden or "plant" transmitters and the like and will be described with respect to devices of this general type. Prior art devices accomplish remote actuation and powering of a plant unit by rectifying the radio frequency energy beamed on the plant unit from a central source and using the rectified energy to power suitable local circuit means. In the case of amplitude modulation the rectified energy powers a transistor oscillator and associated speech amplifier and modulator circuits. In the case of frequency modulation a reactance modulator circuit could be included in the plant unit which would require a portion of the rectified energy feeding the local oscillator or a capacitance microphone could be used to achieve the frequency modulation permitting all of the rectified energy to be utilized by the local oscillator.

Plant units such as those described in the foregoing paragraph are seen to be markedly inefficient when a comparison is made between the radio frequency power transmitted to the plant unit from a central source and the power output of the plant unit. In addition, plant units of this type require frequency stabilization of their local oscillators in order to maintain a narrow bandwidth, low noise system. The use of frequency stabilizing means adds to the complexity of the system and results in a further lowering of the operating efficiency.

It is a primary object of the present invention to provide a remotely actuated radio frequency powered device capable of a high conversion efficiency approaching the theoretical maximum. Another object of this invention is to provide a remotely actuated radio frequency powered transmitter comprising means to receive radio frequency energy at one frequency and transmit at a different carrier frequency, including a completely passive frequency multiplier as the local carrier frequency generator therein. Another object of this invention is to provide an improved remotely actuated radio frequency powered transmitter including a single dual band antenna for receiving radio frequency energy, and means to simultaneously multiply the frequency of the received radio frequency energy beamed thereon, for the purpose of retransmission, and rectify the received radio frequency energy to provide a source of power for the said transmitter.

In the drawings forming part of this specification:

Basically, the invention comprises a remotely located passive element receiver and/or transmitter adapted to be actuated and powered from a centrally located radio frequency energy source. The basic transmitter circuit comprises a tuned receiving circuit having frequency multiplying means therein to both rectify and multiply the frequency of the received radio frequency (hereinafter referred to as R.F.) energy to provide a source of carrier frequency and excite a transmitting circuit tuned to the same multiple of the frequency from the centrally located source. A local microphone is utilized to supply the modulation for the carrier frequency generated, the power for the modulating means being provided by the rectifying action of the frequency multiplying means. Information may also be received by incorporating a demodulating means such as an earphone type speaker powered by the rectified R.F. energy.

Figure 1:
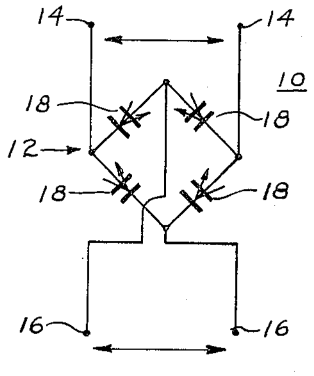
FIGURE 1 is a schematic diagram of one embodiment of a frequency multiplier circuit in the present invention.

Referring in detail to the drawings and more particularly to FIGURE 1, a frequency multiplier circuit 10 is shown as comprising a full-wave rectifier bridge 12 having a pair of input terminals 14 and a pair of output terminals 16. The rectifier bridge comprises four solid-state rectifier arms 18 comprising either germanium, gallium arsenide, gallium antimonide, silicon, varactor diodes, tunnel diodes, or any passive non-linear device, the latter being symbolically indicated in the drawing.

Since the rectifier bridge 12 cast on both half cycles of the input signal at the input terminals 14, the frequency of the rectified signal appearing at the output terminals 16 of the rectifier bridge 12 contains both a rectified or direct current component and an R.F. harmonic component at a frequency equal to twice the input frequency. The relative magnitudes of the D.C. and the R.F. harmonic components depend on the power level at which the multiplier bridge is energized. Thus, both a rectifying action as well as a frequency doubling action is provided by the circuit 10.

Because of its symmetry, the full wave rectifier bridge provides a 1:1 impedance ratio between input and output making possible an unlimited cascade of similar units to achieve even harmonic multiplication in powers of two.

An additional advantage is gained by the use of varactor diodes and/or back tunnel diodes in the rectifier bridge circuit 12 whereby conversion efficiencies in the range between 80 and 90 percent or greater are made possible.

Figure 2:
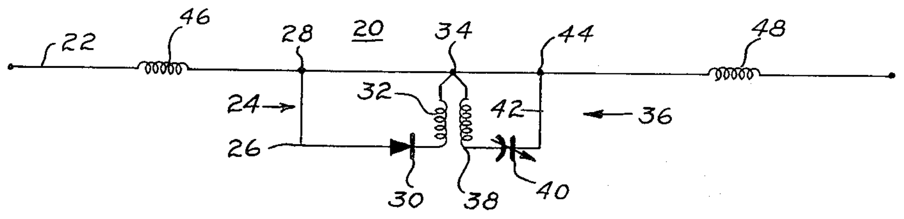
FIGURE 2 is a schematic diagram of one embodiment of the invention.

Referring now to FIGURE 2, a transponder circuit 20 is shown as comprising a dual band antenna 22 tuned to a first or reception frequency and a harmonic multiple of the said first frequency hereinafter referred to as the transmission frequency.

A first passive resonant or input network 24 is provided comprising a first matching section 26 coupled at one end 28 to the antenna 22, a diode 30 in series with the matching section 26 and a first inductance 32 connected in series with the said diode 30 and first matching section 26 between the diode and a terminal 34 on the antenna 22.

A second passive resonant or output network 36 is inductively coupled to the first network 24 by means of a second inductance 38 connected to the same terminal 34 on the antenna 22 as the inductance 32 and properly positioned for coupling therewith. The remainder of the output network 36 comprises a tuning capacitor 40 connected in series with the second inductance 38 and a second matching section 42 also in series therewith between the tuning capacitor 40 and a terminal 44 on the antenna 22.

A pair of selectively tuned trap coils 46 and 48 are provided so that the antenna presents a low impedance to both the reception frequency and the transmission frequency which is a harmonic multiple thereof.

In the embodiment shown, for example, the input network 24 is tuned to the second harmonic of the reception frequency. The received signal is fed through the first matching section 26 to the diode 30 where it is clipped, causing the input network 24 to resonate at the second harmonic of the input signal.

The resonant energy in the input network 24 is coupled to the output network 36 through the two inductors 32 and 38. The output network 36 is tuned to the transmission frequency which is the same harmonic multiple of the reception frequency as the input network 24 but is coupled to the antenna 22 through the second matching section 42 which is selected to feed the antenna at the transmission frequency.

Thus, by the use of all passive elements and with no local power supply, radio frequency energy may be received by the transponder 20 at a given reception frequency and retransmitted at a preselected transmission frequency which is a preselected harmonic multiple of the said reception frequency.

Figure 3:
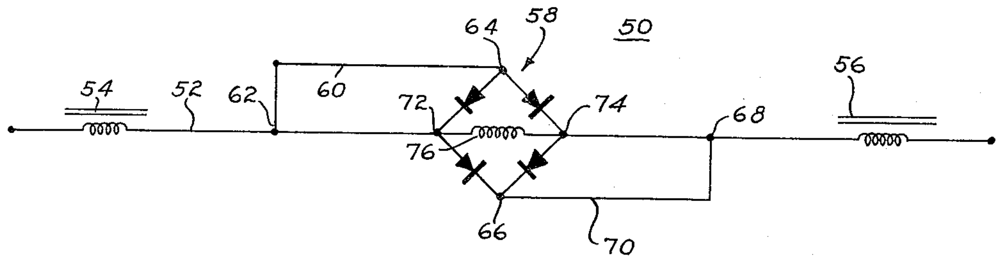
FIGURE 3 is a schematic diagram of another embodiment of the invention.

A further embodiment of the transponder of FIGURE 2 is shown in FIGURE 3. The transponder circuit 50 in FIGURE 3 is shown to comprise a dual band antenna 52, with appropriate trap coils 54 and 56, feeding a first signal at a given reception frequency into a bridge type frequency doubler circuit 58, similar to the multiplier circuit of FIGURE 1 and being fed by the said doubler circuit 58 at a transmission frequency which is the second harmonic of the reception frequency.

A first matching section 60 tuned to the reception frequency feeds the doubler circuit 58 from a terminal 62 on the antenna 52 through one terminal 64 of a diagonally arranged pair of terminals 64 and 66. The other terminal 66 of the diagonal pair is an output terminal for the doubled reception or transmission frequency which is fed to a terminal 68 on the antenna 52 through a second matching section 70 selectively tuned therefore.

The antenna 52 is also coupled through the doubler bridge circuit 58 by the opposite pair of diagonally disposed terminals 72 and 74 which have an R.F. choke 76 connected therebetween.

The use of the two matching sections 60 and 70 and the manner in which they are connected with the doubler circuit 58 and the antenna 52 provides two resonant networks coupled through the bridge circuit 58 with the operation of the transponder circuit 50 substantially equivalent to that of the transponder 20 shown in FIGURE 2.

The efficiency of the circuit of FIGURE 3, however, is made much greater than that of FIGURE 2 by the use of the bridge type doubler circuit 58.

As can be seen from the foregoing description this invention provides automatic transponder and transceiver communication systems wherein remotely located transmitters may be contructed of completely passive circuit elements capable of deriving all the necessary operating power from the R.F. energy received from the central station, simultaneously multiplying the received fundamental frequency transmit either a modulated or unmodulated harmonic of the fundamental frequency of the central station back to the said central station.

While I have described and illustrated one form which my invention may take, it will be apparent to those skilled in the art that other embodiments, as well as modifications of that disclosed, may be made and practiced without departing in any way from the spirit or scope of the invention, for the limits of which reference must be made to the appended claims.

What is claimed is:

1. A transponder circuit comprising a dual band antenna for receiving radio frequency energy at a fundamental frequency and re-transmitting said energy at a harmonic of said fundamental frequency, a first passive network resonant at said harmonic frequency selectively coupled with said antenna for receiving energy at said fundamental frequency and multiplying the fundamental frequency to the harmonic frequency, said first passive network comprising a first matching section tuned to feed radio frequency energy at the fundamental frequency from the antenna to the first network, a diode in series with the matching section for clipping said energy, a first inductance in series with said diode and connected through the antenna with the first matching section, the diode, first matching section and first inductance comprising a resonant circuit tuned to resonate at a desired harmonic of the fundamental frequency and being powered totally by the energy received by the antenna and clipped by the diode, and a second passive network resonant at the harmonic frequency coupled with the first network and energized thereby, the second network being selectively coupled to the antenna to feed energy to said antenna at the harmonic frequency whereby transmission of energy at said harmonic frequency is effected.

2. A transponder circuit comprising a dual band antenna for receiving radio frequency energy at a fundamental frequency and re-transmitting said energy at a harmonic of said fundamental frequency, a first passive network resonant at the harmonic frequency selectively coupled with the antenna for receiving energy at the fundamental frequency and multiplying the fundamental frequency to the harmonic frequency, and a second passive network resonant at the harmonic frequency coupled with the first network and energized thereby, the second network being selectively coupled to the antenna to feed energy to the antenna at the harmonic frequency whereby transmission of energy at the harmonic frequency is effected, said second passive network comprising a second inductance having a common connection at the antenna with the first inductance and inductively coupled therewith, a tuning capacitor in series with the second inductance and a second matching section in series with the second inductance and the tuning capacitor and connected through the antenna with the second inductance and tuned to feed radio frequency energy at the desired harmonic of the fundamental frequency to the antenna, the second resonant network being tuned to resonate at the harmonic frequency and energized by the first resonant network by means of the inductive coupling between the first and second inductances.

References Cited in the file of this patent

UNITED STATES PATENTS 2,927,321 Harris ---------------- Mar. 1, 1960